(12) United States Patent
Gattavari et al.

(10) Patent No.: US 6,370,042 B2
(45) Date of Patent: Apr. 9, 2002

(54) SELF-RECOVERING DISABLING SYSTEM FOR CONVERTER

(75) Inventors: Giuseppe Gattavari, Busto Arsizio; Claudio Adragna, Monza; Mauro Fagnani, Nerviano, all of (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 0 days.

(21) Appl. No.: 09/805,452

(22) Filed: Mar. 13, 2001

(30) Foreign Application Priority Data

Mar. 17, 2000 (EP) .............................. 00830202

(51) Int. Cl.⁷ ..................... H02M 3/335; H02H 7/122
(52) U.S. Cl. ................ 363/21.01; 363/21.04; 363/21.12; 323/901
(58) Field of Search ................ 363/21.01, 21.04, 363/21.12, 56.01, 97; 323/901, 908

(56) References Cited

U.S. PATENT DOCUMENTS

| | | | |
|---|---|---|---|
| 5,083,254 A | | 1/1992 | Feldtkeller ................... 363/21 |
| 5,761,057 A | * | 6/1998 | Muchenberger ............ 363/124 |
| 5,815,380 A | * | 9/1998 | Cuk et al. .................... 363/16 |
| 6,252,783 B1 | * | 6/2001 | Huh et al. ............... 363/21.01 |
| 6,295,213 B1 | * | 9/2001 | Smith ......................... 363/56 |
| 6,295,214 B1 | * | 9/2001 | Matsumoto et al. ..... 363/21.01 |

* cited by examiner

Primary Examiner—Bao Q. Vu
(74) Attorney, Agent, or Firm—Lisa K. Jorgenson; Allen, Dyer, Doppelt, Milbrath & Gilchrist, P.A.

(57) ABSTRACT

A self-disabling and self-recovering converter includes a transformer connected to a power source and has an auxiliary winding for providing a self-supply voltage after start-up, and an integrated circuit having circuitry and a plurality of pins connected thereto. The converter also includes at least one external line and a sensor connected thereto for an electrical or physical quantity to be monitored. The at least one external line is biased through a first pin with the self-supply voltage, and is functionally coupled to a second pin when a threshold is surpassed. A sectionable voltage clamp chain is connected between the auxiliary winding and a voltage reference. A self-recovery circuit having a first input is connected to the auxiliary winding and a second input is connected through the second pin to the at least one external line. An output of the self-recovery circuit is connected to the sectionable voltage clamp chain for sectioning a portion thereof to the voltage reference for self-supplying the integrated circuit.

43 Claims, 3 Drawing Sheets

SELF-RECOVERING DISABLING SYSTEM FOR CONVERTER

FIELD OF THE INVENTION

The present invention relates to AC-DC and DC-DC converters, voltage adapters, battery chargers and similar circuits which may or may not be functioning in a switched mode.

BACKGROUND OF THE INVENTION

In voltage adapters, battery chargers, and power supplies that can be directly plugged into an AC power source, and more generally into a DC-DC converter, with or without isolation, it is necessary to provide protection systems from short-circuits, over-voltages, over-temperatures, etc. The protection systems are necessary to preserve the integrity of the integrated device that commonly contains power supply, drive and control circuitry of the converter, and/or any other external component that must be protected. These other external components include power transistors, transformers, and diodes, for example. Such protection is commonly provided by connecting external components to dedicated pins of the integrated circuit of the converter.

Thermal protection is commonly provided by an active or passive component that is sensitive to temperature. This component is suitably connected to one or more fixed or variable resistors, or to another passive or active element that biases an external temperature sensing line coupled to two dedicated pins of the integrated circuit. On a first pin is available a constant reference voltage that can be generated by an integrated regulator to which a terminal of the external line sensitive to the temperature is connected. Another functional node of the sensing line is coupled to a second input pin of the integrated circuit to force the disabling of the power switch or switches of the converter, and thus to turn-off completely the converter when a certain maximum temperature is surpassed.

A drawback of these known systems is the inability of self-recovering when the temperature returns below the threshold value. This is because the internally generated biasing voltage of the network detecting the temperature becomes null upon the turning-off of the entire integrated device, thus placing the system in a latch condition. To restart, the system must be momentarily disconnected from the power source.

In applications where this is unacceptable or inconvenient, an auxiliary power supply or voltage regulator is used for generating a constant reference voltage for biasing the sensing temperature line. This approach is burdensome because of the extra cost of the auxiliary supply circuit, and it is in contrast with recent European Community rules on the limitation of energy absorption from the power source under no load conditions, for example.

A diagram of a typical power supply that can be directly connected to a power source and employing a DC-DC converter with a transformer T1 provided with an auxiliary winding L1 for self-supplying the integrated circuit IC during normal operation of the converter is depicted in FIG. 1. After the circuit has been started, the voltage induced on the auxiliary winding L1 is rectified by the diode D1 and filtered by the capacitor C1, thus providing a certain self-supplying voltage Vcc to the integrated circuit IC of the converter.

Start-up takes place customarily by way of a start-up resistance Rstart-up or an equivalent active component that can be, as in the depicted example, directly coupled to the power source, or to the output node of the rectifying bridge. Therefore, on the Vcc node a suitably limited voltage is produced by way of the voltage divider of which Rstart-up is part and through a voltage regulator circuit, which is usually internal to the integrated circuit IC. The functional circuits of the integrated circuit are powered at a regulated supply voltage enabling and driving the switching of the power switch PW at a certain oscillating frequency starting up the DC-DC converter. Upon the start of the oscillations, the voltage induced on the self-supply winding L1 is the voltage Vcc. This voltage continues to power at a suitable level the IC, thus ensuring at steady state conditions a correct functioning of the IC.

Two typical protection networks are depicted in the diagram of FIG. 1. Protection from over voltages is implemented by the voltage divider RA and RB dimensioned such to disable the converter circuit when a certain maximum threshold voltage is surpassed (DISABLE signal). In order to restart the converter it is necessary to unplug it from the power source and reconnect it.

As shown, the thermal protection line may be typically formed by an active or passive component sensitive to the temperature. In the example shown, the component includes a nonlinear resistor with a negative temperature coefficient (NTC) and a series connected resistor Rs. A second resistor can optionally be connected in series between the NTC and Rs to make it easier to set a desired threshold temperature.

As discussed above, the temperature detection line (NTC and Rs) is usually biased at an appropriate reference voltage that is internally generated by connecting the line to a dedicated pin, Vref, of the integrated circuit IC. Alternatively, where it is necessary to ensure a self-recovery function, the temperature sensing line is biased by an auxiliary regulator AUX, illustrated with dashed lines, such to allow the self-recovery of an operative state by the system upon the returning of the temperature below the fixed threshold value.

The stopping of the converter in presence of an excessive temperature is ensured by suitably coupling the temperature detection line to a dedicated input pin A-REC of the integrated circuit IC. This is done so that when the temperature threshold is surpassed any further switching of the power switch PW, is disabled. In case of other configurations of the converter employing two or more switches, they are also disabled. This practically disables the whole integrated circuit. It is evident that there is a need for a thermal protection system with a self-recovery ability without requiring the use of an external auxiliary voltage regulator for biasing the external temperature sensing line.

There are numerous applications, as alarm and security or safety systems, whether remote or not, wherein it is required to switch off completely the power supply to the functional circuits of the particular system or subsystems thereof. This is done whenever a certain pre-established threshold of a physical quantity is typically represented in general terms by the change of the state of an ON/OFF type sensor. The physical quantity includes temperature, and even other levels such as luminance, sound level, pressure, liquid level, presence of smoke and the like. Even in these applications, the ability of self-recovering of the power supply by re-enabling the functioning of the converter when the alarm condition is no longer present can be necessary or advantageous.

SUMMARY OF THE INVENTION

It is an object of the present invention to provide a self-disabling and self-recovering converter that uses a specific sensor for monitoring when an electrical or physical quantity reaches a certain threshold value within a power supply. This sensor advantageously uses as a biasing voltage the same regulated self-powering voltage during the start-up phase of the converter circuit.

In this way it is possible to ensure the availability of a voltage reference that is always present through the start-up circuit which is directly connected to the power source or rectifying bridge output, even while the integrated circuit of the converter is latched because of the switching of the sensor.

The self-recovery function of the disabling circuit is ensured even though the converter circuit has been turned off, which brings the entire power supply to very low consumption conditions. These conditions are practically equivalent to the current consumption of the start-up circuit of the converter, plus the current consumption of the sensor line can be made very low.

The disabling system with self-recovery ability according to the present invention comprises a regulator stage which is commonly intrinsic to the start-up circuit of the device, and a modifiable voltage clamp chain that may be customarily formed with a plurality of Zener diodes or equivalent devices connected between the output node Vcc of the self-supply rectifying circuit and a common ground node of the circuit.

The disabling system further includes a voltage divider of the regulated self-supply voltage, and a hysteresis comparator having an inverting input coupled to a first node of the voltage divider, and a second non-inverting input functionally connected to a pin of the IC device to which is coupled a functional node of an external sensing line of the physical or electrical quantity being monitored. The output of the comparator controls a first hysteresis transistor having its current terminals coupled to a second node of the voltage divider and to the common ground node, and a second transistor sectioning the clamp line by short-circuiting to ground when turned on a part of the Zener diodes or functionally equivalent devices that form the clamp chain.

A logic AND gate includes an input functionally coupled through an inverting stage to the output of the hysteresis comparator, and an output generates a disabling logic signal for all functional circuits of the comparator. The external sensor line is biased by connecting it through a dedicated pin of the integrated circuit of the comparator to the regulated self-supply voltage.

DETAILED DESCRIPTION OF THE PREFERRED EMBODIMENTS

Figure 1:
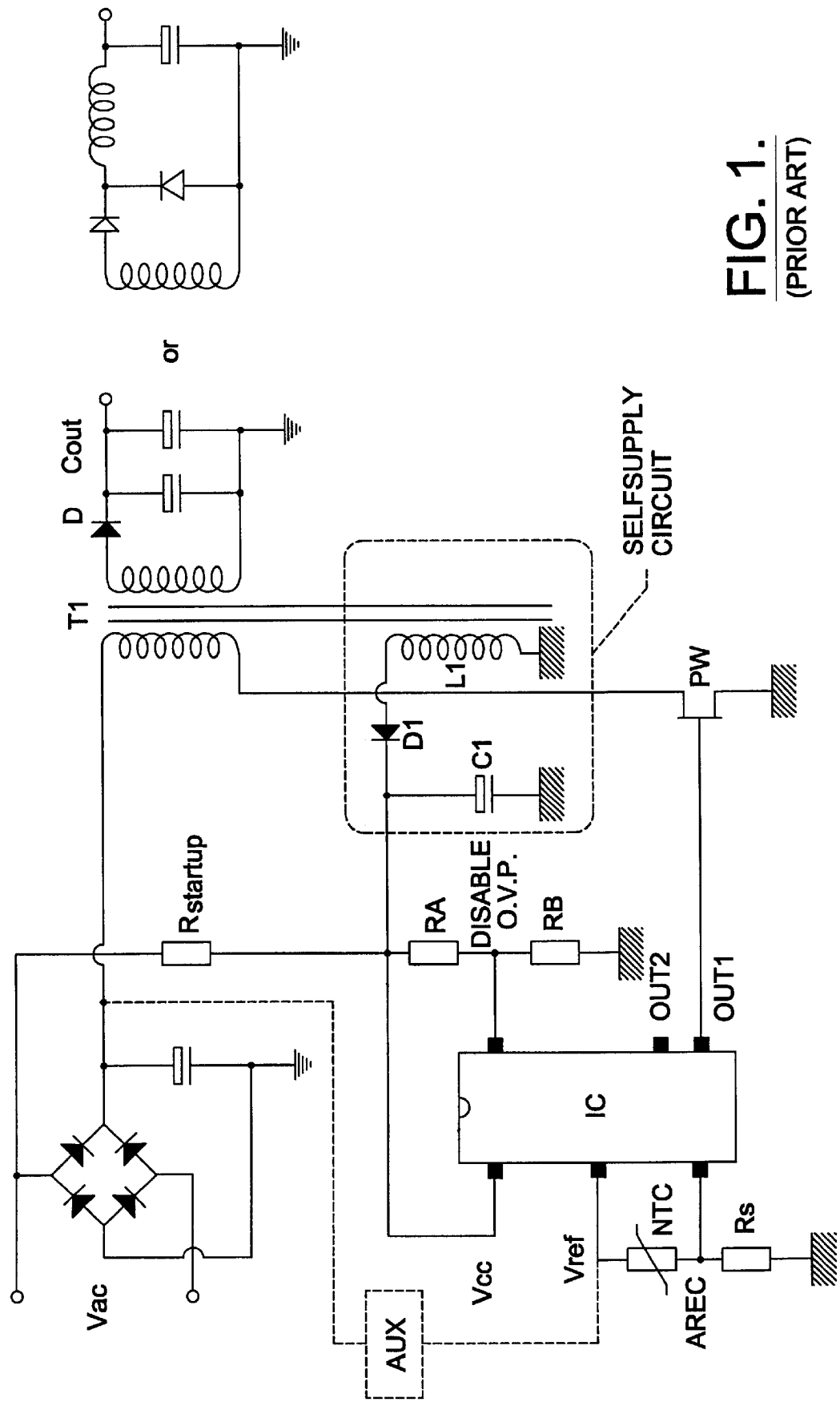
FIG. 1 is a schematic diagram of two alternative configurations of a switching power supply directly connected to a power source according to the prior art.
Figure 2:
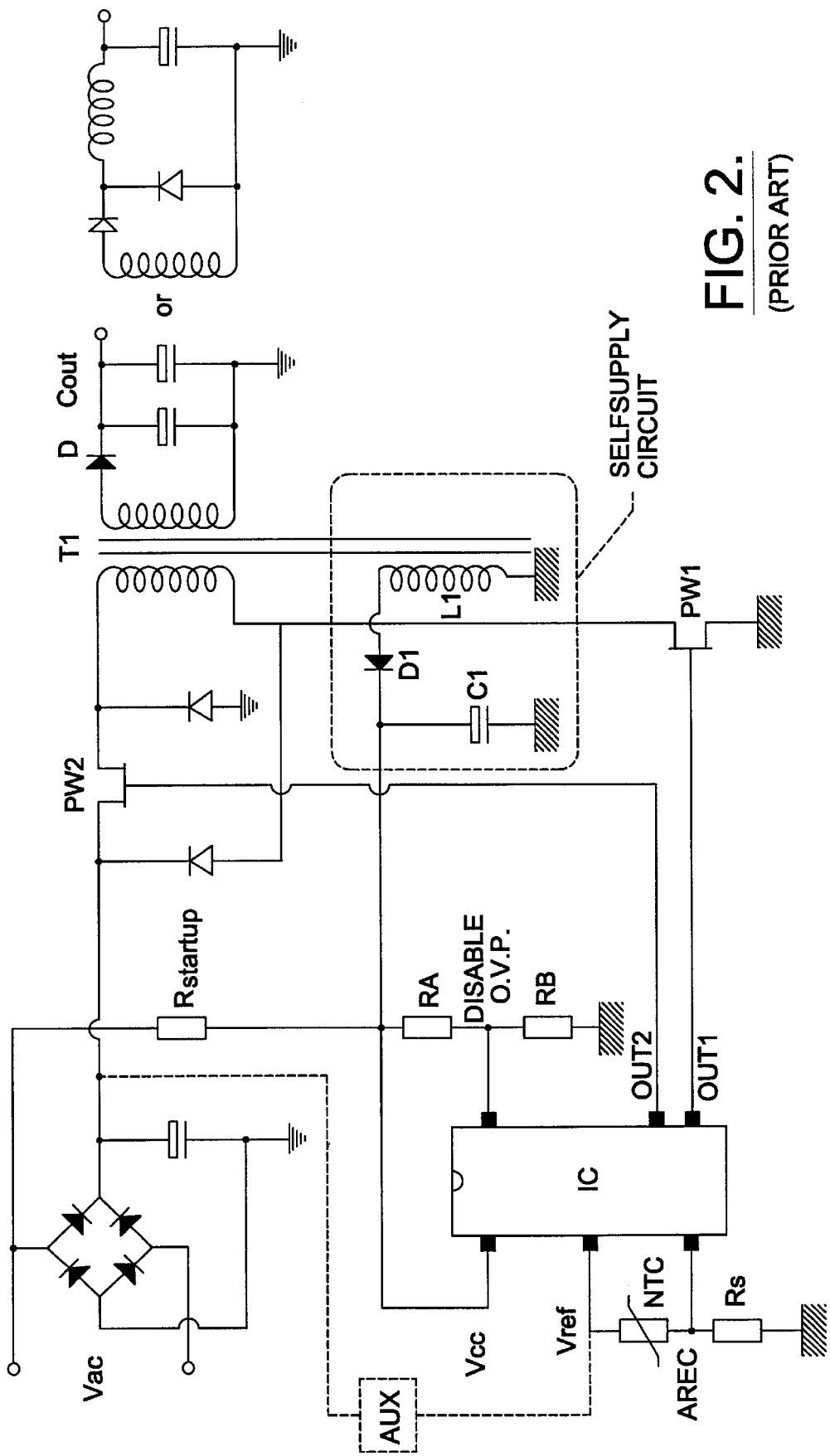
FIG. 2 is a schematic diagram of other alternative configurations of a switching power supply directly connected to a power source according to the prior art.

Commonly used configurations of a DC-DC converter of a switching power supply connected to an electrical power source are depicted in FIGS. 1 and 2. A flyback converter (quasi-resonant) and its forward variation are depicted in FIG. 1. A flyback asymmetric half-bridge converter and its forward variation are depicted in FIG. 2. There are many other configurations such as full-bridge Push-Pull and Zero Voltage Switch (ZVS), full-bridge Push-Pull and phase shift, for example, that are well known to one skilled in the art. In all these cases, a commercially available integrated circuit IC is normally used containing all the driving, controlling and protecting circuitry of the converter. Connected to dedicated pins of the IC are external power components, configuration components, programming components and eventual sensor lines to implement self-disabling functions.

By way of example, the invention will be illustrated in detail by referring to the realization of a switching power supply for direct connection to the power source, and in which a disabling function with self-recovery is implemented without using any auxiliary supply AUX, as depicted in FIGS. 1 and 2 by the phantom (dash) lines. Also by way of example, a physical quantity to be monitored is the temperature and the sensor used is, as illustrated, a non-linear resistance with a negative temperature coefficient NTC. Naturally, the triggering function can be inverted if required by inverting the position of NTC and Rs in the sensing line.

More generally, the sensor used will be chosen as a function of the quantity to be detected, and instead of a negative temperature coefficient resistor, other compatible devices may be used. These devices include a positive coefficient resistor, a bimetal switch, a thermocouple, a microswitch, a photoresistance, a phototransistor, a gas or vapor detector, a sound detector or any other device suitable to detect the surpassing of a certain pre-established threshold value by the physical or electrical quantity to be monitored.

According to the application examples illustrated in FIGS. 1 and 2, the thermo-sensitive element NTC decreases its resistance value when the temperature increases such that the voltage on the pin A-REC of the integrated circuit IC that contains the circuitry of the converter increases proportionally with the detected temperature. When the voltage on the functional node of the temperature sensing line formed by the NTC and by the resistor Rs reaches a certain pre-established threshold, a circuit of the IC disables the converter circuit, obviously stopping any further switching of the power switch PW.

Figure 3:
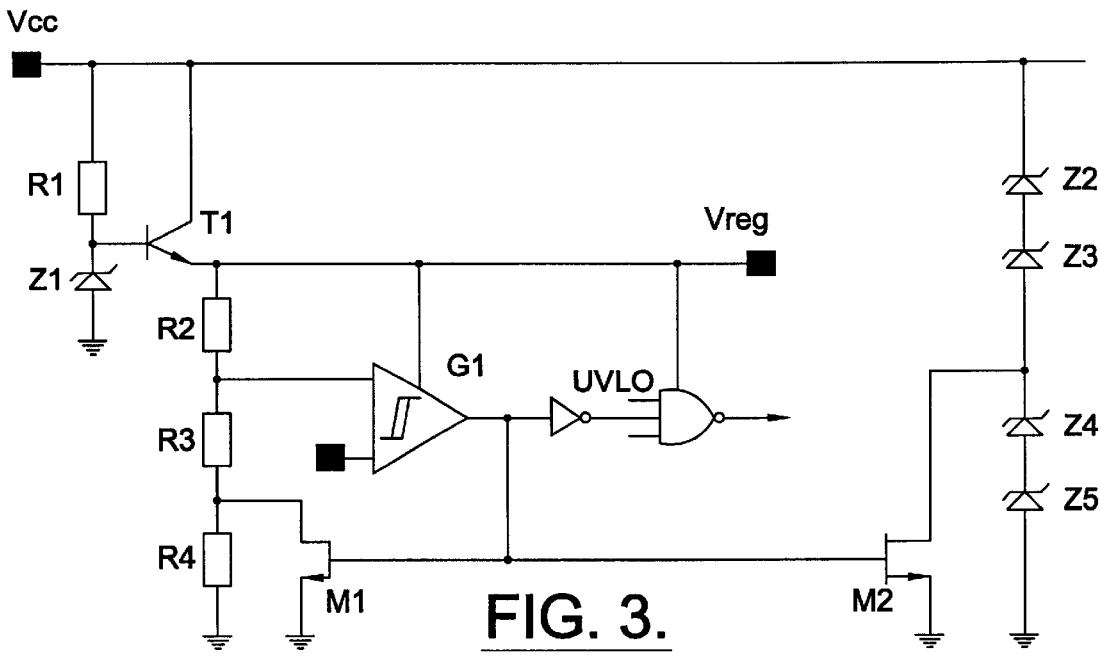
FIG. 3 is a schematic diagram of the disabling circuit with self-recovery according to the present invention.

The self-recovery circuit of the invention is depicted in FIG. 3 and can be integrated in any commercial IC converter device. The circuit diagram of FIG. 3 includes also the voltage regulator circuit formed by R1, Z1 and T1 that is generally already present in known ICs. The integrated voltage regulator is functionally coupled through a dedicated pin to the voltage Vcc that is produced by the external self-supply circuit formed by C1, D1 and L1. The regulator regulates the supply voltage of the integrated circuit to a certain relatively stable value Vreg, which is commonly equal to 5V.

According to the present invention, such a self-supply regulated voltage Vreg of the integrated circuit is made available external, as depicted through the pin Vreg to which the temperature sensing line is connected. In the example shown, the temperature sensing line is formed by NTC and Rs, which is functionally analogous to the diagram of FIG. 1.

The thermal hysteresis is established in this case by the ratio of the resistances of the NTC sensor and of the series resistor Rs, and by the hysteresis of the comparator G1. The comparator G1 has a non-inverting input (+) coupled to the temperature control pin A-REC, while the other inverting input (−) of the comparator G1 is biased at a certain threshold voltage. This threshold voltage is referred to the regulated supply voltage itself and is obtained by a resistive partition of the regulated supply voltage Vreg, using the voltage divider formed by R2, R3 and R4.

A certain hysteresis is imposed to the comparator G1, by using a hysteresis transistor M1 controlled by the output of the comparator whose current terminals are coupled to a second tap of the voltage divider and to the common ground node of the circuit, respectively.

The non-inverting input of the comparator G1 can be biased, for example, to a voltage of about 2.7V through the voltage divider R2, R3 and R4. The bias can be such that when the voltage on the pin A-REC rises above such a threshold voltage of 2.7 V, the comparator will switch. When the voltage on the pin A-REC coupled to the intermediate node of the external temperature sensing line surpasses the reference threshold, the comparator output switches, thus disabling all the functional circuits of the converter except the so-called Under Voltage Lock Out (UVLO) circuit, i.e., the start-up circuit. The reference threshold is established by connecting the inverting input (−) of the comparator to a first tap of the voltage divider of the regulated supply voltage Vreg. This brings the power supply circuit to a state of low current absorption.

The disabling of the converter circuit is executed by a logic command output by a logic NAND gate to an input of which is functionally coupled, in the illustrated example, the output of the comparator G1 by way of an inverting stage. Practically any other eventual disabling commands generated by other protections, such as, for example, the signal DISABLE that is produced by an over voltage sensing line, can be applied to dedicated inputs of the logic NAND gate.

To prevent other disabling commands produced by different sensors from interfering with the self-recovery functionality, the voltage on the node Vcc, which commonly may be clamped or limited to a value of about 25V, is automatically reduced to a markedly lower limit value, for example, to about 12.5V. This is done by short-circuiting with a transistor M2, controlled from the comparator output G1, two of four Zener diodes that, in the illustrated example, make up the voltage clamp chain of the Vcc node.

In this way other disabling signals generated by protection devices different from the thermal protection of the circuit of the invention will not interfere with the self-recovery function. Spurious interventions of the over voltage protection line (OVP) will be effectively prevented.

Figure 4:
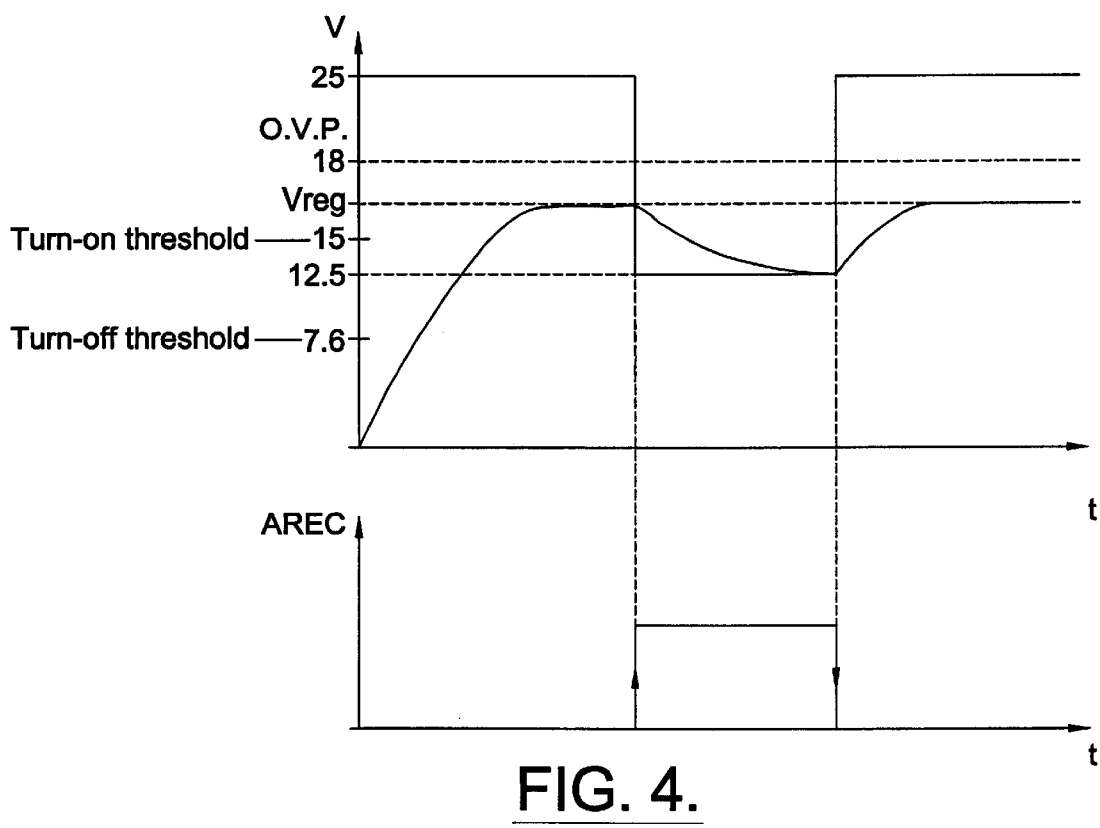
FIG. 4 is a graph illustrating operation of the disabling circuit with self-recovery according to the present invention.

The functioning of the self-recovery circuit of the example depicted in FIG. 3 is illustrated by the diagrams of FIG. 4, wherein the voltage levels of the different thresholds of the thermal and over voltage protections are indicated.

The self-recovery function provided by the circuit of the invention can be exploited to implement a thermal protection of one or more components of the system, eventually programming both the turn-off temperature and the turn-on temperature for each component. By using as a reference voltage the regulated self-supply voltage of the integrated device, the system will automatically restart after the temperature drops back below the pre-established maximum threshold value. Of course, the circuit of the invention may support visual indication, for example, by the use of an LED, of the switching of the thermal protection in order to readily ascertain the cause of the stoppage.

That which is claimed is:

1. A self-disabling and self-recovering converter comprising:

a transformer connected to a power source and comprising an auxiliary winding for providing a self-supply voltage after start-up;

an integrated circuit comprising circuitry and a plurality of pins connected thereto;

a start-up circuit connected to the power source and to said integrated circuit;

a rectifying circuit connected to said auxiliary winding for rectifying the self-supply voltage;

an integrator regulator stage connected to said rectifying circuit for generating a regulated self-supply voltage for powering said integrated circuit;

at least one external line and a sensor connected thereto for an electrical or physical quantity to be monitored, said at least one external line being biased through a first pin with the regulated self-supply voltage and being functionally coupled to a second pin when a threshold is surpassed;

a sectionable voltage clamp chain connected between an output of said rectifying circuit and a voltage reference;

a voltage divider connected to said integrator regulator stage for deriving a first voltage and a second voltage from the regulated self-supply voltage;

a hysteresis comparator having a first input connected to said voltage divider for receiving the first voltage, and a second input connected through the second pin to said at least one external line;

a first transistor comprising a control terminal connected to an output of said hysteresis comparator and being controlled thereby, a first conduction terminal connected to said voltage divider for receiving the second voltage, and a second conduction terminal connected to the voltage reference;

a second transistor comprising a control terminal connected to the output of said hysteresis comparator and being controlled thereby, a first conduction terminal connected to said sectionable voltage clamp chain, and a second conduction terminal connected to the voltage reference for sectioning a portion of said sectionable voltage clamp chain to the voltage reference for self-supplying said integrated circuit; and at least one logic gate having an input connected to the output of said hysteresis comparator, and an output for providing a disabling logic command signal when the threshold is surpassed.

2. A converter according to claim 1, wherein the first input of said hysteresis comparator is an inverting input and the second input is a non-inverting input.

3. A converter according to claim 1, wherein said at least one logic gate comprises a NAND gate.

4. A converter according to claim 1, wherein said sectionable voltage clamp chain comprises a plurality of Zener diodes.

5. A converter according to claim 1, wherein said at least one external line comprises at least one of a non-linear resistor with a negative temperature coefficient, a resistor with a positive temperature coefficient, a bimetal switch, a thermocoupler, a photoresistor, a phototransistor, a sound detector, a microswitch, a smoke detector, a vapor detector and a gas detector.

6. A converter according to claim 1, wherein the converter implements a switched mode power supply directly connected to the power source.

7. A converter according to claim 6, wherein the switched mode power supply comprises at least one of a quasi-resonant flyback converter, a quasi-resonant forward converter, a half-bridge asymmetric flyback converter, a forward half-bridge asymmetric converter, a full-bridge phase shift push-pull converter, and a full-bridge zero voltage switch push-pull converter.

8. A self-disabling and self-recovering converter comprising:
- a transformer connected to a power source and comprising an auxiliary winding for providing a self-supply voltage after start-up;
- an integrated circuit comprising circuitry and a plurality of pins connected thereto;
- a start-up circuit connected to the power source and to said integrated circuit;
- a rectifying circuit connected to said auxiliary winding for rectifying the self-supply voltage;
- an integrator regulator stage connected to said rectifying cicuit for generating a regulated self-supply voltage for powering said integrated circuit;
- at least one external line and a sensor connected thereto for an electrical or physical quantity to be monitored, said at least one external line being biased through a first pin with the regulated self-supply voltage and being functionally coupled to a second pin when a threshold is surpassed;
- a sectionable voltage clamp chain connected between an output of said rectifying circuit and a voltage reference;
- a voltage divider connected to said integrator regulator stage;
- a self-recovery circuit having a first input connected to said voltage divider and a second input connected through the second pin to said at least one external line, and an output connected to said sectionable voltage clamp chain for sectioning a portion thereof to the voltage reference for self-supplying said integrated circuit; and
- at least one logic gate having an input connected to the output of said self-recovery circuit, and an output for providing a disabling logic command signal when the threshold is surpassed.

9. A converter according to claim 8, wherein the voltage divider derives a first voltage and a second voltage from the regulated self-supply voltage; and wherein said self-recovery circuit comprises:
- a hysteresis comparator having a first input for receiving the first voltage, and a second input connected through the second pin to said at least one external line;
- a first transistor comprising a control terminal connected to an output of said hysteresis comparator and being controlled thereby, a first conduction terminal connected to said voltage divider for receiving the second voltage, and a second conduction terminal connected to the voltage reference; and
- a second transistor comprising a control terminal connected to the output of said said hysteresis comparator and being controlled thereby, a first conduction terminal connected to said sectionable voltage clamp chain, and a second conduction terminal connected to the voltage reference for sectioning the portion of said sectionable voltage clamp chain.

10. A converter according to claim 8, further comprising an inverter connected to the output of said hysteresis comparator; and wherein the input of said at least one logic gate is connected to the output of said inverter.

11. A converter according to claim 10, wherein said at least one logic gate comprises a NAND gate.

12. A converter according to claim 9, wherein the first input of said hysteresis comparator is an inverting input and the second input is a non-inverting input.

13. A converter according to claim 8, wherein the voltage reference is ground, and wherein the portion of said sectionable voltage clamp chain being sectioned by said self-recovery circuit is sectioned to ground.

14. A converter according to claim 8, wherein said sectionable voltage clamp chain comprises a plurality of Zener diodes.

15. A converter according to claim 8, wherein said at least one external line comprises at least one of a non-linear resistor with a negative temperature coefficient, a resistor with a positive temperature coefficient, a bimetal switch, a thermocoupler, a photoresistor, a phototransistor, a sound detector, a microswitch, a smoke detector, a vapor detector and a gas detector.

16. A converter according to claim 8, wherein the converter implements a switched mode power supply directly connected to the power source.

17. A converter according to claim 16, wherein the switched mode power supply comprises at least one of a quasi-resonant flyback converter, a quasi-resonant forward converter, a half-bridge asymmetric flyback converter, a forward half-bridge asymmetric converter, a full-bridge phase shift push-pull converter, and a full-bridge zero voltage switch push-pull converter.

18. A self-disabling and self-recovering converter comprising:
- a transformer connected to a power source and comprising an auxiliary winding for providing a self-supply voltage after start-up;
- an integrated circuit comprising circuitry and a plurality of pins connected thereto;
- at least one external line and a sensor connected thereto for an electrical or physical quantity to be monitored, said at least one external line being biased through a first pin with the self-supply voltage and being functionally coupled to a second pin when a threshold is surpassed;
- a sectionable voltage clamp chain connected between said auxiliary winding and a voltage reference; and
- a self-recovery circuit having a first input connected to said auxiliary winding and a second input connected through the second pin to said at least one external line, and an output connected to said sectionable voltage clamp chain for sectioning a portion thereof to the voltage reference for self-supplying said integrated circuit.

19. A converter according to claim 18, further comprising at least one logic gate having an input connected to the output of said self-recovery circuit, and an output for providing a disabling logic command signal when the threshold is surpassed.

20. A converter according to claim 18, further comprising a start-up circuit connected to the power source and to said integrated circuit.

21. A converter according to claim 18, further comprising:
- a rectifying circuit connected to said auxiliary winding for rectifying the self-supply voltage; and
- an integrator regulator stage connected to said rectifying circuit for generating a regulated self-supply voltage for powering said integrated circuit.

22. A converter according to claim 21, further comprising a voltage divider connected to said integrator regulator stage for deriving a first voltage and a second voltage from the regulated self-supply voltage; and wherein the first input of said self-recovery circuit receives the first voltage.

23. A converter according to claim 18, further comprising a voltage divider connected to said auxiliary winding for deriving a first voltage and a second voltage from the self-supply voltage; and wherein said self-recovery circuit comprises:

a hysteresis comparator having a first input for receiving the first voltage, and a second input connected through the second pin to said at least one external line;

a first transistor comprising a control terminal connected to an output of said hysteresis comparator and being controlled thereby, a first conduction terminal connected to said voltage divider for receiving the second voltage, and a second conduction terminal connected to the voltage reference; and a second transistor comprising a control terminal connected to the output of said hysteresis comparator and being controlled thereby, a first conduction terminal connected to said sectionable voltage clamp chain, and a second conduction terminal connected to the voltage reference for sectioning the portion of said sectionable voltage clamp chain.

24. A converter according to claim 23, further comprising an inverter connected to the output of said hysteresis comparator; and wherein the input of said at least one logic gate is connected to the output of said inverter.

25. A converter according to claim 24, wherein said at least one logic gate comprises a NAND gate.

26. A converter according to claim 23, wherein the first input of said hysteresis comparator is an inverting input and the second input is a non-inverting input.

27. A converter according to claim 18, wherein the voltage reference is ground, and wherein the portion of said sectionable voltage clamp chain being sectioned by said self-recovery circuit is sectioned to ground.

28. A converter according to claim 18, wherein said sectionable voltage clamp chain comprises a plurality of Zener diodes.

29. A converter according to claim 18, wherein said at least one external line comprises at least one of a non-linear resistor with a negative temperature coefficient, a resistor with a positive temperature coefficient, a bimetal switch, a thermocoupler, a photoresistor, a phototransistor, a sound detector, a microswitch, a smoke detector, a vapor detector and a gas detector.

30. A converter according to claim 18, wherein the converter implements a switched mode power supply directly connected to the power source.

31. A converter according to claim 30, wherein the switched mode power supply comprises at least one of a quasi-resonant flyback converter, a quasi-resonant forward converter, a half-bridge asymmetric flyback converter, a forward half-bridge asymmetric converter, a full-bridge phase shift push-pull converter, and a full-bridge zero voltage switch push-pull converter.

32. A method for disabling in a self-recoverable manner a converter comprising a transformer connected to a power source and comprising an auxiliary winding for providing a self-supply voltage after start-up; an integrated circuit comprising circuitry and a plurality of pins connected thereto; and a sectionable voltage clamp chain connected between the auxiliary winding and a voltage reference, the method comprising:

biasing at least one external line and sensor connected thereto through a first pin with the self-supply voltage for monitoring an electrical or physical quantity;

functionally coupling the at least one external line to a second pin when a threshold is surpassed; and biasing a self-recovery circuit having a first input connected to the auxiliary winding and a second input connected through the second pin to the at least one external line, and an output connected to the sectionable voltage clamp chain for sectioning a portion thereof to the voltage reference for self-supplying the integrated circuit.

33. A method according to claim 32, further comprising providing a disabling logic command signal based upon an output signal from the self-recovery circuit.

34. A method according to claim 32, further comprising starting the converter using a start-up circuit connected to the power source and to the integrated circuit.

35. A method according to claim 32, further comprising:

rectifying the self-supply voltage; and generating a regulated self-supply voltage based upon a rectified self-supply voltage for powering the integrated circuit.

36. A method according to claim 35, further comprising deriving a first voltage and a second voltage from the regulated self-supply voltage.

37. A method according to claim 36, wherein the self-recovery circuit comprises:

a hysteresis comparator having a first input for receiving the first voltage, and a second input connected through the second pin to at least one external line;

a first transistor comprising a control terminal connected to an output of the hysteresis comparator and being controlled thereby, a first conduction terminal connected for receiving the second voltage, and a second conduction terminal connected to the voltage reference; and a second transistor comprising a control terminal connected to the output of the hysteresis comparator and being controlled thereby, a first conduction terminal connected to the sectionable voltage clamp chain, and a second conduction terminal connected to the voltage reference for sectioning the portion of the sectionable voltage clamp chain.

38. A method according to claim 37, further comprising an inverter connected to the output of the hysteresis comparator; and wherein the input of the at least one logic gate is connected to the output of the inverter.

39. A method according to claim 38, wherein the at least one logic gate comprises a NAND gate.

40. A method according to claim 32, wherein the voltage reference is ground, and wherein the portion of the sectionable voltage clamp chain being sectioned by the self-recovery circuit is sectioned to ground.

41. A method according to claim 32, wherein the sectionable voltage clamp chain comprises a plurality of Zener diodes.

42. A method according to claim 32, wherein the at least one external line comprises at least one of a non-linear resistor with a negative temperature coefficient, a resistor with a positive temperature coefficient, a bimetal switch, a thermocoupler, a photoresistor, a phototransistor, a sound detector, a microswitch, a smoke detector, a vapor detector and a gas detector.

43. A method according to claim 32, wherein the converter implements a switched mode power supply directly connected to the power source.

\* \* \* \* \*

UNITED STATES PATENT AND TRADEMARK OFFICE
CERTIFICATE OF CORRECTION

PATENT NO.    : 6,370,042 B2
DATED         : April 9, 2002
INVENTOR(S)   : Giuseppe Gattavari, Claudio Adragna and Mauro Fagnani It is certified that error appears in the above-identified patent and that said Letters Patent is hereby corrected as shown below:

Column 7,
Line 62, delete "claim 8" insert -- claim 9 --

Signed and Sealed this

Twenty-second Day of October, 2002

Attest:

Attesting Officer

JAMES E. ROGAN
Director of the United States Patent and Trademark Office